United States Patent
Bokelmann et al.

(10) Patent No.: US 7,648,202 B2
(45) Date of Patent: Jan. 19, 2010

(54) VEHICLE SEAT WITH A SEAT TILT ADJUSTMENT COMBINED WITH A FOLD FLAT MECHANISM WITH A RETURN FUNCTION

(75) Inventors: Tobias Bokelmann, Groebenzell (DE); Stanislaw Andrzej Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/107,552

(22) Filed: Apr. 22, 2008

(65) Prior Publication Data

US 2008/0315655 A1 Dec. 25, 2008

(30) Foreign Application Priority Data

Jun. 25, 2007 (DE) .................. 10 2007 029 167

(51) Int. Cl.
*B60N 2/02* (2006.01)

(52) U.S. Cl. ..................... 297/341; 297/378.1

(58) Field of Classification Search .......... 297/341, 297/340, 317, 316, 378.1, 342, 329, 284.11, 297/322, 324, 332, 333, 318
See application file for complete search history.

(56) References Cited

U.S. PATENT DOCUMENTS

| | | | |
|---|---|---|---|
| 2,815,796 A | 12/1957 | Lobanoff | |
| 4,131,316 A * | 12/1978 | Pallant et al. | 297/341 |
| 4,152,024 A | 5/1979 | Farelli | |
| 4,334,709 A * | 6/1982 | Akiyama et al. | 297/284.11 |
| 4,368,916 A | 1/1983 | Blasin | |
| 4,382,629 A | 5/1983 | Froumajou | |
| 4,402,547 A | 9/1983 | Weston et al. | |
| 4,438,974 A | 3/1984 | Kresky et al. | |
| 4,475,769 A | 10/1984 | Crawford et al. | |
| 4,568,106 A | 2/1986 | Yokoyama | |
| 4,623,192 A | 11/1986 | Koide et al. | |
| 4,629,252 A | 12/1986 | Myers et al. | |
| 4,636,003 A | 1/1987 | Siebler | |
| 4,767,156 A * | 8/1988 | Yamada et al. | 297/313 |
| 5,076,528 A * | 12/1991 | VanDuser | 248/419 |
| 5,346,281 A | 9/1994 | Hughes | |
| 5,370,440 A | 12/1994 | Rogala | |
| 5,397,167 A | 3/1995 | Fourrey et al. | |
| 5,482,349 A | 1/1996 | Richter et al. | |

(Continued)

FOREIGN PATENT DOCUMENTS

DE 699 19 622 T2 9/2005

(Continued)

OTHER PUBLICATIONS

German Office Action dated Nov. 1, 2008, 3 pgs.

(Continued)

*Primary Examiner*—Milton Nelson, Jr.
(74) *Attorney, Agent, or Firm*—Brooks Kushman P.C.

(57) ABSTRACT

A vehicle seat includes a seat bottom and a seat back. The seat bottom includes a forward section and a rear section. The seat back is pivotably mounted about the seat bottom. The seat back is positionable in a reclined position and a folded position. The pivotable link system characteristically positions the forward section of the seat bottom in a lowered position and one or more raised positions.

12 Claims, 4 Drawing Sheets

U.S. PATENT DOCUMENTS

| | | | |
|---|---|---|---|
| 5,531,503 A | 7/1996 | Hughes | |
| 5,588,707 A * | 12/1996 | Bolsworth et al. | 297/378.12 |
| 5,673,971 A | 10/1997 | Wieclawski | |
| 5,795,019 A | 8/1998 | Wieclawski | |
| 5,871,255 A | 2/1999 | Harland et al. | |
| 5,904,404 A | 5/1999 | McCulloch et al. | |
| 5,941,602 A | 8/1999 | Sturt et al. | |
| 5,979,985 A | 11/1999 | Bauer et al. | |
| 6,070,934 A | 6/2000 | Schaefer et al. | |
| 6,089,641 A | 7/2000 | Mattarella et al. | |
| 6,152,515 A | 11/2000 | Wieclawski | |
| 6,213,549 B1 | 4/2001 | Wieclawski | |
| 6,273,511 B1 | 8/2001 | Wieclawski | |
| 6,336,679 B1 | 1/2002 | Smuk | |
| 6,398,291 B1 | 6/2002 | Reusswig et al. | |
| 6,520,581 B1 | 2/2003 | Tame | |
| 6,688,696 B2 * | 2/2004 | Brush et al. | 297/378.1 |
| 6,736,438 B1 | 5/2004 | Wieclawski | |
| 6,908,155 B1 * | 6/2005 | Wieclawski | 297/341 |
| 7,134,716 B2 | 11/2006 | Wieclawski | |
| 7,204,554 B2 | 4/2007 | Wieclawski | |
| 7,278,686 B2 * | 10/2007 | Yoshida | 297/338 |

FOREIGN PATENT DOCUMENTS

| | | |
|---|---|---|
| DE | 10 2006 033 554 A1 | 3/2007 |
| DE | 10 2005 054 503 B3 | 6/2007 |

OTHER PUBLICATIONS

English Abstract corresponding to DE 699 19 622.
English Abstract corresponding to DE 10 2005 054 503.
English Abstract corresponding to DE 10 2006 033 554.

* cited by examiner

VEHICLE SEAT WITH A SEAT TILT ADJUSTMENT COMBINED WITH A FOLD FLAT MECHANISM WITH A RETURN FUNCTION

CROSS-REFERENCE TO RELATED APPLICATIONS

This application claims priority to German Application No. 10 2007 029 0167.3 filed on Jun. 25, 2007, the disclosure of which is hereby incorporated in its entirety.

BACKGROUND OF THE INVENTION

1. Field of the Invention

The present invention relates to automobile seats that are pivotable into reclined and folded positions.

2. Background Art

The competitive nature of the automotive industry provides a continuing impetus to the development of improved vehicle system. In particular, vehicle interior components are particularly important because of the direct interaction such components have with the vehicle operator and passengers. Other design pressures are derived from government regulations and the desire to improve fuel efficiency. These latter considerations are frequently at odds with the aesthetic features with the more fuel-efficient vehicles tending to be quite small with limited passenger compartment space.

Many vehicles include rearward vehicle seats positioned in a somewhat limited space. Strategies that improve the comfort of such seats are desirable. In a typical vehicle seat, both the rearward and forward seats usually have a cushion angle that is not well adapted for all passengers, which of course may be any size. In all vehicles, and in particular, the smaller vehicles, it is desirable to have seats that fold and provide increase rear storage space.

Accordingly, there is a need in the prior art for improved vehicle seats that provide increased comfort for vehicle occupants while being foldable.

SUMMARY OF THE INVENTION

The present invention solve one or more problems of the prior art by providing in at least one embodiment a vehicle seat that is positionable in one or more raised positions. The vehicle seat of this embodiment includes a seat bottom and a seat back. The seat bottom includes a forward section and a rear section. The seat back is pivotably mounted about the seat bottom. The seat back is positionable in a reclined position and a folded position. In particular, the seat back and therefore the vehicle seat is advantageously foldable to substantially flat configuration. This feature renders such seat useful for increase storage space in a vehicle. The pivotable link system characteristically positions the forward section of the seat bottom in a lowered position and one or more raised positions. This positionability is referred to as tilt adjustability. In addition to providing tilt adjustability, the vehicle seats of the present embodiment capable of being folded and/or being positioned in a reclined position. Advantageously, the vehicle seat of the present invention provides increase occupant comfort (especially when positioned as a rearward seat) as well as increase storage space.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
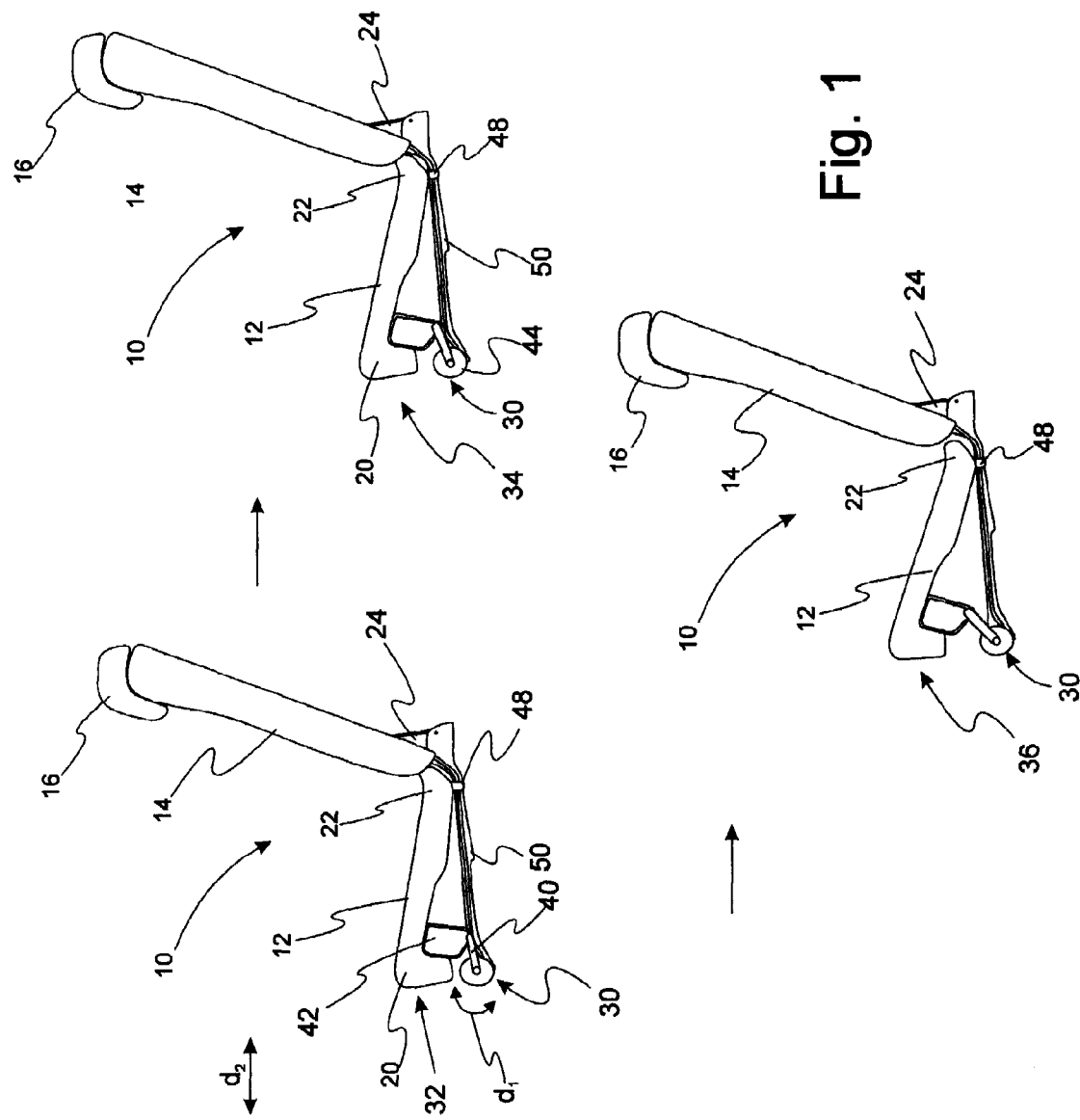
FIG. 1 provides schematic illustrations demonstrating the ability of a seat bottom to be positioned at various heights so as to accommodate a vehicle occupant using the seat.

With reference to FIG. 1, schematic illustrations demonstrating the ability of a seat bottom to be positioned at various heights so as to accommodate a vehicle occupant using the seats. FIG. 1 shows the transitioning of the seat bottom from the lowest position to an intermediate position and then to the highest position 1. Vehicle seat 10 includes seat bottom 12, seat back 14, and head restraint 16. Seat bottom 12 includes forward section 20 and rear section 22. Seat back 14 is pivotably mounted to bracket 24 to move about seat bottom 12. Pivotable link system 30 is capable of positioning forward section 20 of seat bottom 12 into lowered position 32, intermediately raised position 34, and highest position 36. It should be appreciated that additional intermediate position are as also contemplated within the present embodiment. Movement of forward section 20 is accomplished by the movement of pivotable link system 30. Pivotable link system 30 includes link 40 and bracket 42, which is moveably attached to link 40. Rotation of link 40 along direction d1 causes bracket 42 to move thereby moving seat bottom 12 as set forth above. Typically, link 40 is rotated by a user rotating a knob in communication with pulley 44, which is in turn in communication with link 40. In a refinement of the present invention, the knob may be operated with one hand. Movement of forward section 20 is also accompanied by translational movement of seat bottom 12 along direction d2. Guide 48 is attached to seat bottom 12. Guide 48 directs translation (i.e., sliding) of seat bottom 12 along support member 50 which functions as a track while also accommodating the tilting that occurs when front section 20 is raised.

Figure 2:
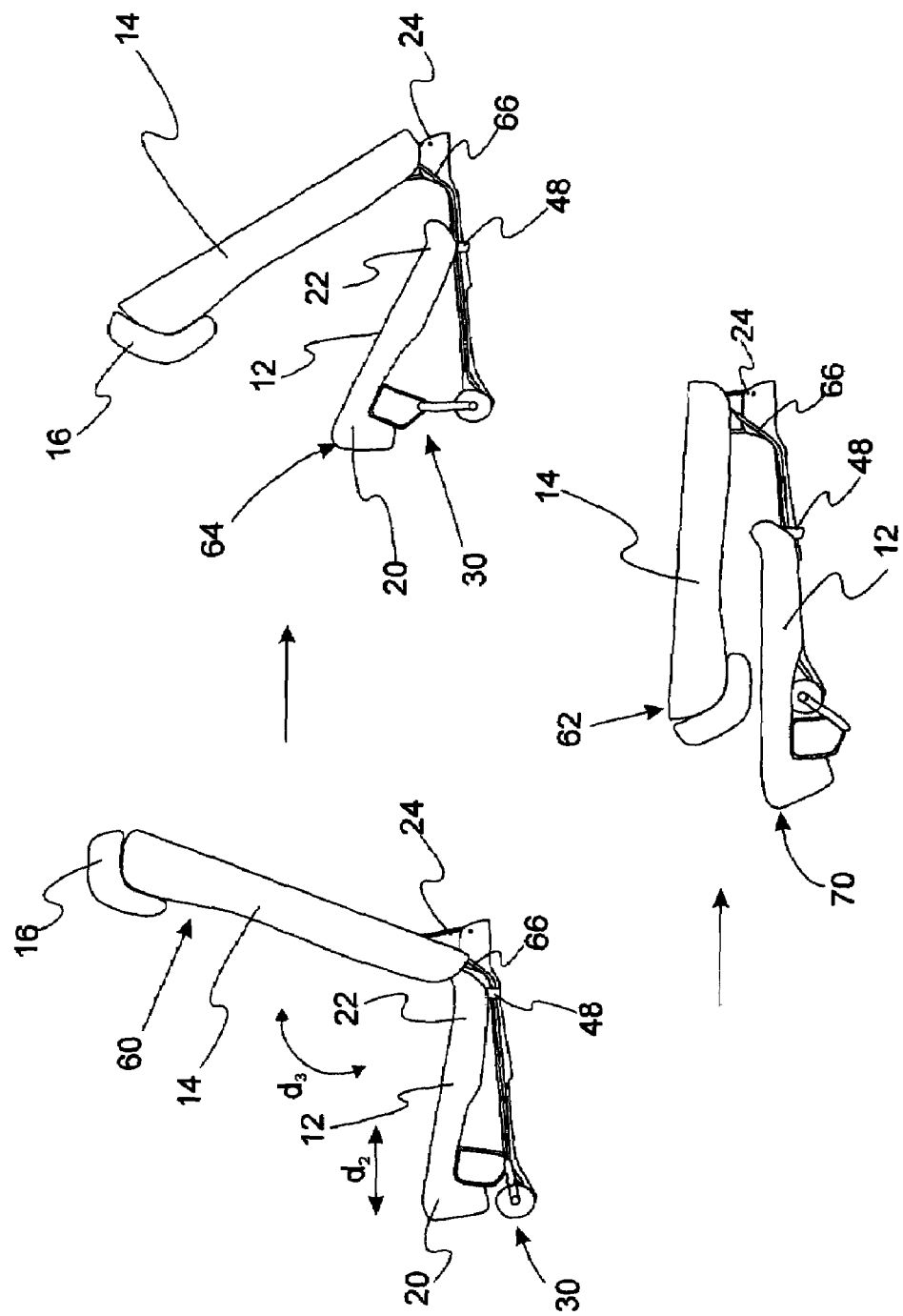
FIG. 2 provides schematic illustrations demonstrating the folding of an embodiment of a vehicle seat.

With reference to FIG. 2, schematic illustrations demonstrating the folding of an embodiment of a vehicle seat. FIG. 2 shows the transitioning of the seat from the design position to the folded position. In this variation, seat back rotates along direction d3 to transition from raised position 60 to folded position 62 and back when desired. Movement of seat back 14 is coupled to movement of the link system 30 so that as seat back 14 is folding link system 30 moves forwarded section 20 to raised position 64 and then to extended position 62. Movement of seat bottom 12 in this manner is accompanied with translational motion along direction d2 so that seat bottom 12 is positioned at extended position 70 when seat back 14 is fully folded. The coupled movements of seat bottom 12 and seat back 14 during folding is accomplished via pulley 44, which is attached to cable 66. Cable 66 moves within a housing that does not significantly move. When seat back 14 is folded cable 66 is pulled in a manner such that pulley 44 and link system 30 are rotated as set forth above.

Figure 3:
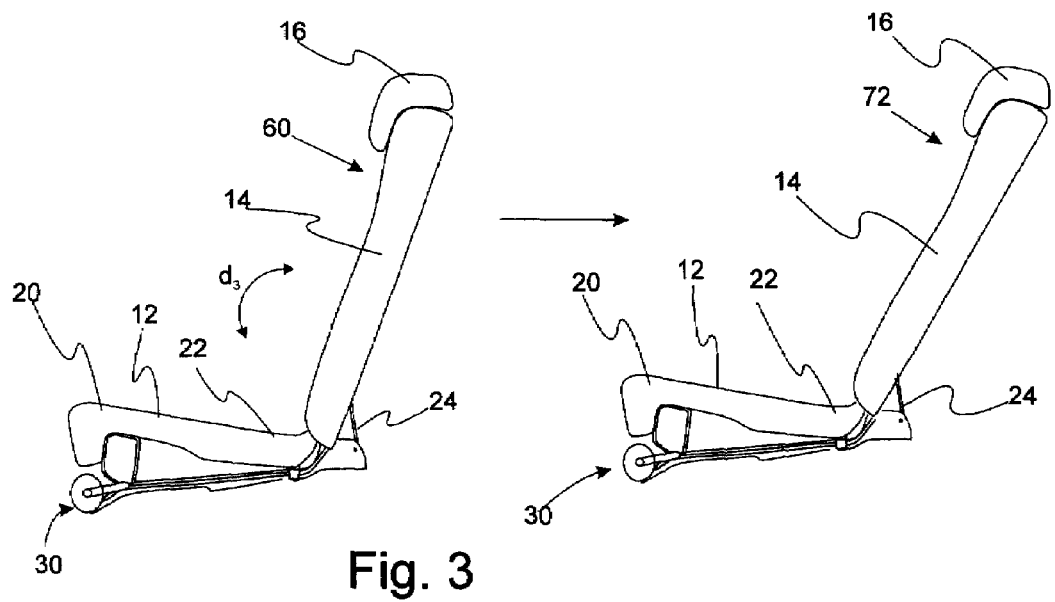
FIG. 3 provides schematic illustrations demonstrating movement of the vehicle seat of FIGS. 1 and 2 to a reclined.

With reference to FIG. 3, schematic illustrations demonstrating movement of the vehicle seat of FIGS. 1 and 2 to a reclined position is provided. In this variation, seat back rotates along direction d3 to transition from raised position 60 to reclined position 72 and back when desired.

Figure 4:
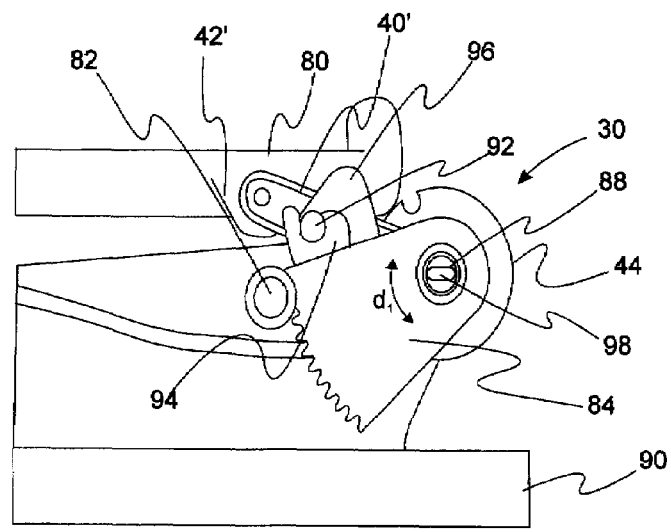
FIG. 4 is a side view of a variation of a linking system used to accomplish the movement shown in FIG. 1.
Figure 5:
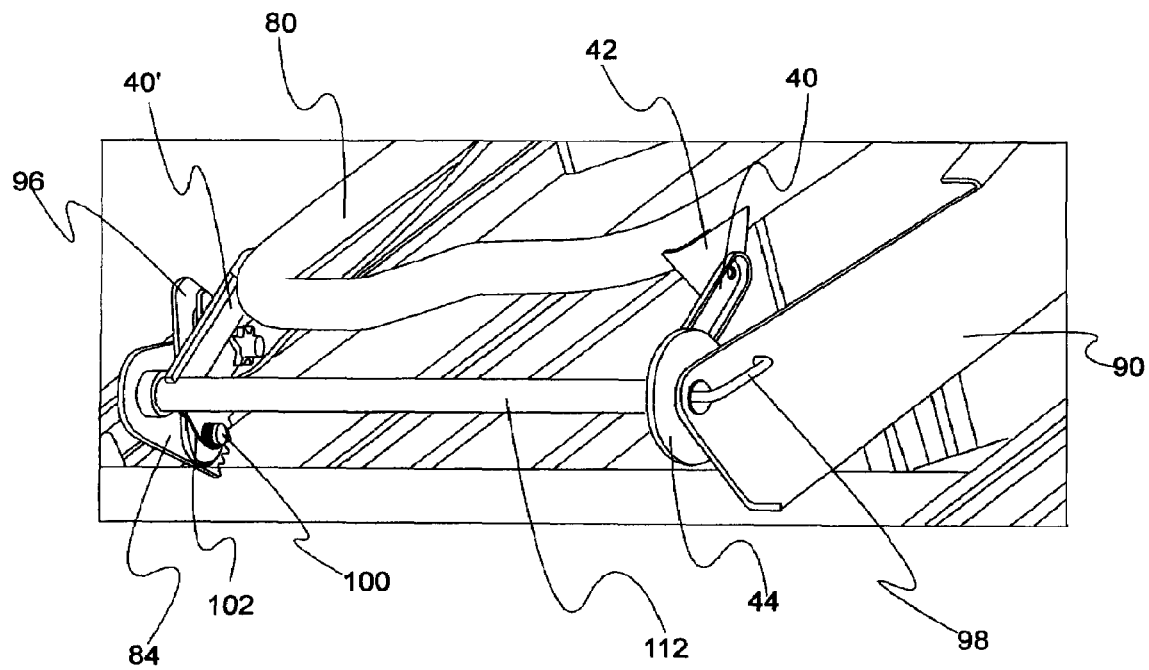
FIG. 5 is perspective view of a variation of a linking system used to accomplish the movement shown in FIG. 1.

With reference to FIGS. 4 and 5, a variation of a specific linking system for raising seat bottom 12 is provided. FIG. 4 is a side view of link system 30 while FIG. 5 is a perspective view of link system 30. Link system 30 includes links 40, 40'. Link 40 is pivotably attached to seat bottom frame 80 via bracket 42 and link 40' is pivotably attached to seat bottom frame 80 via bracket 42'. Rotation of pinion gear 82 causes rotation of sector gear 84 along direction d1 about pivot point 88. A breaking system is associated with pinion gear 82 so as to avoid sagging when the seat is loaded. Pivot point 88 is fixed with respect to support frame 90. Support frame 90 is either directly or indirectly fixed to the vehicle floor. In the specific variation depicted in FIGS. 4 and 5, sector gear moves link 40 via post 92. Post 92 is secured to sector gear 84 by clasping bracket 94 and hook bracket 96. Clasping bracket 94 is attached to sector gear 84 while hook bracket is pivotable about post 100. Spring 102 biases hook bracket 96 such that post 92 is held within clasping bracket 94. During folding, as set forth above in connection with the description of FIG. 2, link 40 is disengaged from clasping bracket 94 by the opening of hook bracket 96 via cable 110. Cable 110 is coupled to the folding of the seat back to accomplish this opening. The disengagement of link system 30 allows rotation of the seat bottom to extended position 70 as set forth above when the seat is folded. Pulley 44 is optionally coupled to sector gear 84 via axle 112 In a variation, although sector gear 84 and pulley 44 are coupled via axle 112, sector gear 82 is able to rotate independently of pulley 44. This feature allows the vehicle seat to have a memory function. Specifically, a seat bottom that is positioned in a raised position by the knob will return to the same position when unfolded after being folded. In another refinement of the present embodiment, torsion rod spring 98 goes through axle 112. Torsion rod spring 98 can bias the seat bottom 12 forward to the extended position 70 or rearward to the lowered position 32.

Finally, in yet another variation of the present embodiment, link system 30 is a conventional recliner system know to those skilled in the art.

Figure 6:
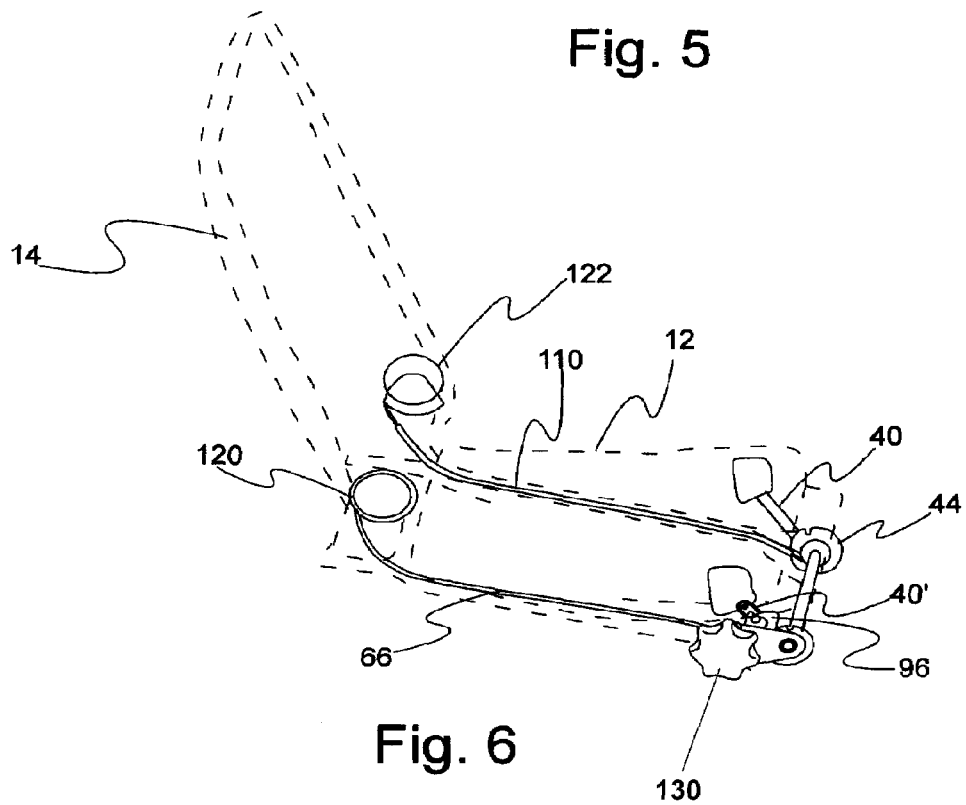
FIG. 6 is a perspective view showing the coupling of the folding of the seat back to the translation of the seat bottom.

With reference to FIG. 6, a schematic illustration showing the coupling of the folding of the seat back to the translation of the seat bottom is provided. During folding, the movement of seat back 14 is coupled to the movement of seat bottom 12 via pulley systems 120, 122 via cables 110, 66. When seat back 14 is folded cable 110 disengages hook bracket 96 as set forth above. Similarly pulley system 122 causes pulley 44 to rotate seat bottom 12 to forward position 70 due to retraction of cable 66 when seat back 14 is folded. FIG. 6 also shows knob 130, which is used by a user to position seat bottom 12 in one or more raised positions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a seat bottom having a forward section and a rear section;
   a seat back pivotable relative to the seat bottom;
   a pivotable link system that positions the forward section of the seat bottom in one or more raised position; and
   a torsion spring that biases the seat bottom forward to an extended position or rearward to a lowered position wherein the seat back is adapted to fold forward, the seat back is in communication with the link system such that positioning the seat back in the folded position causes the seat bottom to move to an extended forward position thereby accommodating the folded seat back, and the seat back is coupled to the link system by a first pulley system that disengages the seat bottom so that the seat bottom may be positioned in the forward extended position.

2. The vehicle seat of claim 1 wherein the link system includes a link attached to the seat bottom.

3. The vehicle seat of claim 1 wherein the link system includes a sector gear that moves the link such that the seat bottom is positioned into the one or more raised positions, the sector gear being positionable in one or more gear positions that correspond to the one or more raised positions.

4. The vehicle seat of claim 3 wherein the link includes a post, which is in communication with the sector gear.

5. The vehicle seat of claim 4 wherein the link system further includes a clasping bracket attached to the sector gear, the clasping bracket engaging the post.

6. The vehicle seat of claim 5 wherein the link system includes a pinion gear in communication with a user operated knob, the pinion gear positioning the sector gear in the one or more gear positions.

7. The vehicle seat of claim 1 wherein the seat back is coupled to the link system by a second pulley system so that the seat bottom is placed in the forward extended position when the seat back is folded.

8. The vehicle seat of claim 1 further comprising a track upon which the seat bottom slides while tilting to a substantially flat folded position.

9. The vehicle seat of claim 1 wherein the seat back is adapted to recline backwards.

10. A vehicle seat comprising:
    a seat bottom having a forward section and a rear section;
    a seat back pivotable relative to the seat bottom, the seat back being adapted to fold forward; and a pivotable link system that positions the forward section of the seat bottom in one or more raised position, wherein the seat back is in communication with the link system such that positioning the seat back in the folded position causes the seat bottom to move to an extended forward position thereby accommodating the folded seat back and wherein the seat back is coupled to the link system by a first pulley system and a second pulley system, the first pulley system disengages the seat bottom so that the seat bottom may be positioned in the forward extended position and the second pulley system is such that the seat bottom is positionable in the forward extended position when the seat back is folded.

11. The vehicle seat of claim 10 further comprising a torsion spring that biases the seat bottom forward to an extended position or rearward to a lowered position.

12. The vehicle seat of claim 10 wherein the link system includes a sector gear that moves the link such that the seat bottom is positioned into the one or more raised positions, the sector gear being positionable in one or more gear positions that correspond to the one or more raised positions.

* * * * *